United States Patent [19]

Ueda

[11] Patent Number: 5,023,860
[45] Date of Patent: Jun. 11, 1991

[54] MULTI-BEAMED OPTICAL PICK-UP

[75] Inventor: Aki Ueda, Yokohama, Japan

[73] Assignee: Ricoh Company, Ltd., Tokyo, Japan

[21] Appl. No.: 276,681

[22] Filed: Nov. 28, 1988

[30] Foreign Application Priority Data

Nov. 26, 1987 [JP] Japan .................................. 62-298652

[51] Int. Cl.$^5$ .......................... G11B 7/00; G11B 27/36
[52] U.S. Cl. .................................. 369/116; 369/44.24;
369/110; 369/112; 369/44.37; 250/201.5
[58] Field of Search ...................... 369/44.23, 106, 112,
369/122, 116, 44.36, 44.37, 44.25–44.35, 32,
124, 109, 44.11; 250/201.4, 201.5, 204, 205,
201.1

[56] References Cited

U.S. PATENT DOCUMENTS

| 4,546,463 | 10/1985 | Opheij et al. | 369/122 |
| 4,771,414 | 9/1988 | Yoshimatsu | 369/112 |
| 4,823,334 | 4/1989 | Tanaka et al. | 369/112 |
| 4,841,512 | 7/1989 | Kubota et al. | 369/106 |

Primary Examiner—Roy N. Envall, Jr.
Assistant Examiner—Thang V. Tran
Attorney, Agent, or Firm—Cooper & Dunham

[57] ABSTRACT

An optical disc system typically includes an optical disc and an optical pick-up for projecting a light beam for recording information. The optical pick-up or at least its objective lens is provided to be movable relative to the optical disc in a predetermined direction. The optical pick-up uses two light beams, one of which is for recording information on the disc and the other of which is for reproducing the information recorded on the disc immediately after it has been recorded for confirmation. In accordance with the present invention, it is so structured that a tracking error of the confirmation light beam on the disc is monitored and the light intensity of the confirmation light beam emitted from the light source is varied in accordance with the detected tracking error of the confirmation light beam on the disc.

6 Claims, 1 Drawing Sheet

MULTI-BEAMED OPTICAL PICK-UP

BACKGROUND OF THE INVENTION

1. Field of the Invention

This invention generally relates to an optical pick-up for use in a optical recording and reproducing system, such as an optical disc system, and, in particular, to an optical pick-up using a multiple of beams.

2. Description of the Prior Art

An optical disc system in which a laser beam from a semiconductor laser is converged into a tiny spot onto an optical disc by an objective lens to carry out recording, reproduction and erasure of information to and from the optical disc has recently attracted much attention. This is because such an optical disc system has various advantages, such as a large capacity and a low cost per bit.

However, it is not free of disadvantages one of which is a relatively long processing time as compared with hard discs, such as magnetic discs. This is because, in the case of recording on an optical disc, in response to a command, an access is made to an optical disc to thereby locate a tiny laser spot at a desired address location of the disc and then information is recorded on the disc. Upon completion of recording, the information thus recorded is then reproduced for confirmation. Accordingly, a recording mode of such an optical disc is a two step operation, including "recording" and "reproduction for confirmation."

In order to cope with this situation, an optical pick-up using a multiple of laser beams has been proposed. That is, in accordance with this proposal, a plurality of laser beams are focused onto the same recording track of an optical disc spaced apart from each other and one of the beams is used for recording information on the recording track while another beam is used to reproduce the information thus recorded immediately after its recording to confirm the recorded information. With this structure, since recording and reproduction for confirmation of the recorded information can be carried out substantially at the same time, the time required for a recording mode can be minimized. A typical optical pick-up of the type using a multiple of beams is discussed, for example, in Japanese Patent Post-examination Publication No. 57-60697.

FIG. 3 illustrates an example of an optical pick-up using two laser beams. As shown, there is provided a semiconductor laser 1 including a pair of light-emitting points 1A and 1B for emitting a pair of laser beams A and B, respectively. These light beams A and B are collimated by a collimator lens 2 and the thus collimated laser beams enter into a beam splitter 3 where the entering laser beams are deflected toward an optical disc 4. The laser beams A and B are then converged into tiny laser spots 4a and 4b, respectively, on the optical disc 4 by means of an objective lens 5. In the illustrated case, the spot 4a is a leading spot for use in recording of information. Thus, during recording mode, the beam A itself is modulated in accordance with information to be recorded. On the other hand, the other beam 4b is a following beam spot which follows the leading spot 4a on the same recording track for use in confirmation of recorded information.

The light reflected from the optical disc 4 again passes through the objective lens 5 in the opposite direction and enters into the beam splitter 3 where the reflected light from the optical disc 4 is separated from the incident light from the collimator lens 2 and directed toward a detection optical system while being converged by a first convergent or focusing lens 6. The beams A and B are converged at different locations by the first convergent lens 6. That is, the recording beam A is first converged by the convergent lens 6 and then again converged by a second convergent lens 7 to be directed toward a two-part light receiving element 8 for use in focus error detection. A prism mirror 9 serving as a knife edge is locate in the optical path of the second convergent lens 7, so that a focusing error detecting operation is carried out based on a well-known knife edge method. On the other hand, a part of the light passing through the second convergent lens 7 is reflected by the prism mirror 9 toward a light-receiving element 10 for use in tracking error detection. The detection of this tracking error signal is carried out by a well-known push-pull method. Focusing and tracking error signals thus obtained are then supplied to a servo control system of the optical pick-up, in particular objective lens 5.

The laser beam B converged by the first convergent lens 6 is reflected by a prism mirror 11 disposed at a focal point of the first convergent lens 6 and the thus reflected light passes through a third convergent lens 12 and then impinges upon a light-receiving element 13 so that a reproduction signal for confirmation is obtained.

In such an optical disc system, since a servo signal is obtained based on the beam A for recording information on the optical disc 4, it is said that the tracking and focusing errors of the recording laser spot are minimized and thus the reliability of an information pit formed on the optical disc 4 by the optical pick-up is increased. However, there is a chance that such tracking and focusing errors could occur for the beam B for use in confirmation of recorded information. For example, when a tracking servo is to be applied by the recording beam A, even if information is recorded properly, there is a change that a tracking error could occur for the confirmation beam B, in which case an error may be present in the signal reproduced for confirmation. As a result, the reliability of the overall operation of the recording mode of the optical pick-up shown in FIG. 3 could be reduced. Such tracking errors could take place, for example, due to differences in radius of curvature between the inner and outer recording tracks, due to disturbances of recording tracks, and due to shifting of the confirmation beam B from a recording track to which information has been recorded by the preceding recording beam A owing to eccentricity of the optical disc.

SUMMARY OF THE INVENTION

In accordance with the present invention, there is provided an optical disc system using a multiple of light beams one of which is used to record information on an optical disc and another of which is used to reproduce the information thus recorded for configuration immediately after recording. The topical disc system includes a means for detecting a tracking error from a confirmation light beam after it has been reflected from an optical disc. And the amount of light intensity of a light source which emits the confirmation light beam is varied in accordance with a tracking error signal produced by the tracking error detecting means.

It is therefore a primary object of the present invention to obviate the disadvantages of the prior art as described above and to provide an improved optical disc system high in performance and reliability.

Another object of the present invention is to provide an improved optical disc system using a multiple of beams in which the intensity of a confirmation light beam is varied in accordance with a tracking error signal of the confirmation light beam.

A further object of the present invention is to provide a multiple beam optical pick-up for use in an optical disc system high in performance and reliable in operation.

A still further object of the present invention is to provide a multiple beam optical pick-up for use in an optical disc system capable of immediately confirming recorded information properly and reliably.

Other objects, advantages and novel features of the present invention will become apparent from the following detailed description of the invention when considered in conjunction with the accompanying drawings.

DESCRIPTION OF THE PREFERRED EMBODIMENTS

Figure 1:
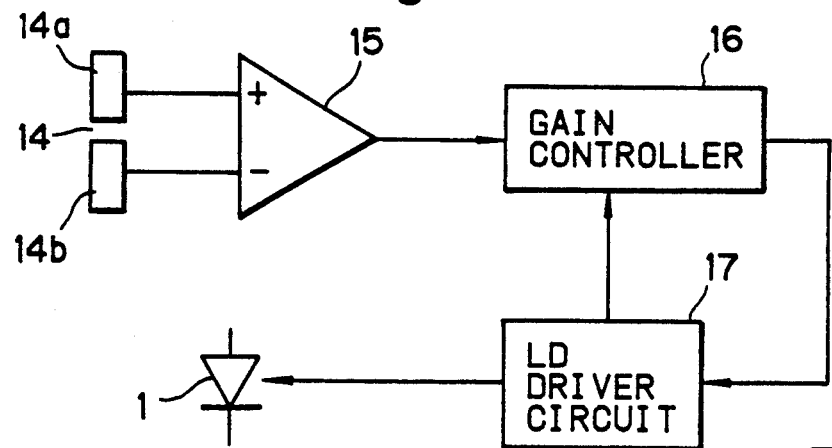
FIG. 1 is a schematic illustration showing a tracking error detecting system of a confirmation light beam in a multiple beam optical pick-up for use in an optical disc system constructed in accordance with one embodiment of the present invention.
Figure 3:
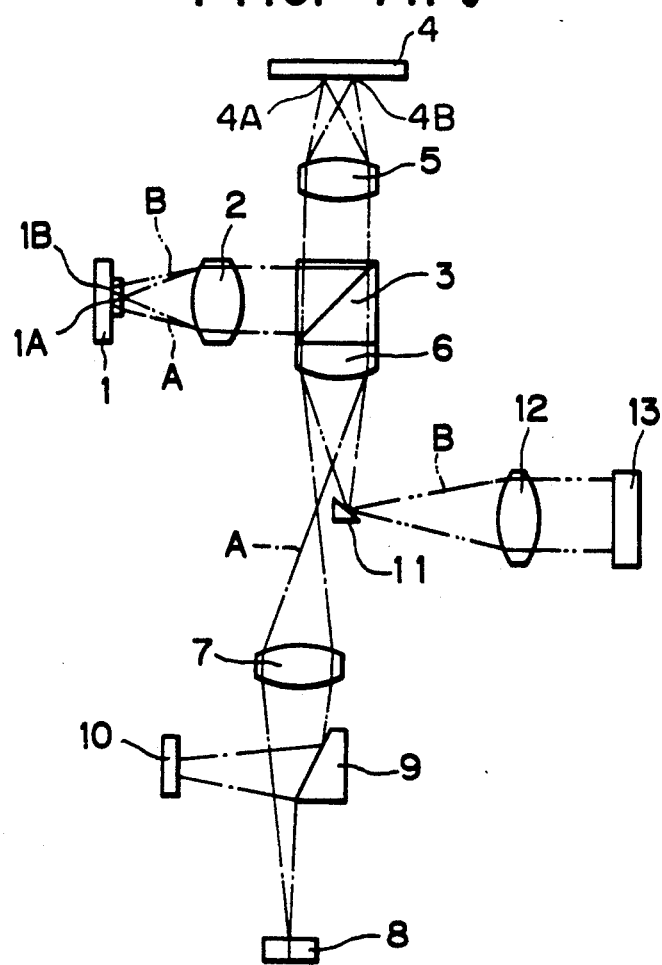
FIG. 3 is a schematic illustration showing the overall structure of a typical prior art optical pick-up for use in an optical disc system.

Referring now to FIG. 1, there is schematically shown system for detecting a tracking error in a confirmation light beam reflected from the optical disc 4 for confirming information recorded on the optical disc 4 and varying the intensity of the confirmation light beam in accordance with the detected tracking error of the confirmation light beam. It is to be noted that the structure shown in FIG. 1 is to be incorporated into the structure shown in FIG. 3 so that the optical pick-up of the present invention has a basic structure similar to that of FIG. 3. The optical pick-up of the present invention is obtained from the structure shown in FIG. 3 by replacing the light receiving element 13 of FIG. 3 by a two-part light receiving device 14 comprised of a pair of light-receiving elements 14a and 14b for detecting a tracking error signal. That is, the two-part light receiving device 14 is provided for receiving the confirmation light beam B reflected from the optical disc 4. The pair of light-receiving elements 14a and 14b is connected to input terminals of a differential amplifier 15 which has its output connected to a gain controller 16. Thus, a difference between the detection signals supplied from the light-receiving elements 14a and 14b is determined by the differential amplifier 15 and thus a tracking error signal of the reflected confirmation light beam B is defined as an output of the differential amplifier 15. The tracking error signal thus output from the differential amplifier 15 is supplied to the gain controller 16 and then to a laser diode (LD) driver circuit 17. Thus, the LD driver circuit 17 controls the level of a drive current to be supplied to a light beam emitting source of the semiconductor laser 1 which emitS the confirmation light beam B. As a result, the light intensity of the confirmation laser beam B emitted from the light beam emitting source of the laser 1 is suitably controlled in accordance with the tracking error signal supplied from the two-part light receiving device 14.

The gain controller 16 controls the gain of the tracking error signal output from the differential amplifier 15 under the control of the LD driver circuit 17 based on the current drive status of the LD drive circuit 17 corresponding to the amount of light output of the confirmation light beam B from the semiconductor laser 1. That is, when the amount of light of the confirmation light beam B increases, the gain is decreased, and, on the other hand, when the amount of light decreases, the gain is increased.

The tracking error signal thus adjusted in gain as described above is input into the LD drive circuit 17 so as to adjust the amount of light or intensity of the confirmation light beam B emitted from the semiconductor laser 1 in accordance with the level of the tracking error signal. That is, when the amount of the tracking error becomes larger, the amount of light of the confirmation light beam B is increased; on the other hand, when the tracking error decreases, the amount of light of the confirmation light beam B is decreased. In this manner, the amount of light of the confirmation light beam B is suitably adjusted in accordance with the level of the tracking error, so that even if the tracking error becomes larger, since the intensity or amount of light of the confirmation light beam B emitted from the laser 1 is increased correspondingly, a reduction of the light level of the reflected confirmation light beam B form the optical disc 4 is compensated, thereby allowing to reproduce recorded information stably and accurately at all times. Incidentally, a reproduction data for confirmation of the recorded information can be obtained by summing the detection signals from the light-receiving elements 14a and 14b.

Figure 2:
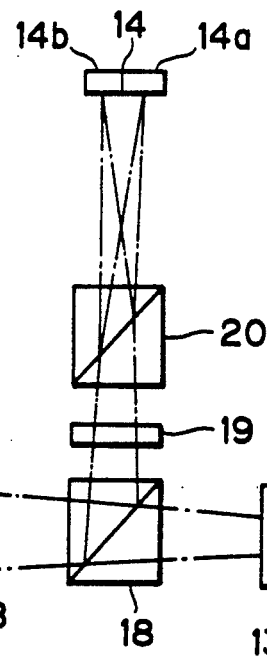
FIG. 2 is a schematic illustration showing a modification of the structure of FIG. 1.

FIG. 2 illustrates a modification of the structure shown in FIG. 1 and this modified structure is intended for use in an optical disc system in which use is made of an opto-magnetic disc for the optical disc 4. FIG. 2 also shown a part of an opto-magnetic optical pickup and it is to be incorporated into the structure shown in FIG. 3 when use is made of an opto-magnetic optical disc as the optical disc 4. The structure shown in FIG. 2 includes a polarization beam splitter 18 disposed between the third convergence lens 12 and the light-receiving element 13 and thus the confirmation light beam B reflected from the optical disc 4 is partly reflected upwardly by the polarization beams splitter 18 and this reflected portion of the confirmation light beam B passes through a half wavelength plate 19 and then a Wollaston polarizing prism 20 and then impinges upon a two-part (or two-division type) light receiving device 14 comprised of a pair of light receiving elements 14a and 14b. Thus, the present invention may also be applicable to the opto-magnetic type with such modification.

As described above, in accordance with the present invention, there is provided a two-part (or two-division) light receiving device for detecting a tacking error of a confirmation light beam for immediately confirming the information recorded on an optical disc, and the amount of light or intensity of the confirmation light beam to be emitted from a light source is controlled in accordance with the level of the tracking error thus detected. Accordingly, when a multiple of beams are used for recording information on an optical disc and for immediately reproducing the information thus recorded for confirmation, even if there occurs a tracking error for the confirmation light beam, the light amount of the confirmation light beam is suitably compensated. As a result, the confirmation light beam is prevented from being deteriorated due to the occurrence of its tacking error at all times so that a recording operation using a multiple of beams is insured to be carried out reliably as well as accurately.

While the above provided a full and complete disclosure of the preferred embodiments of the present invention, various modifications, alternate constructions and equivalents may be employed without departing from the true spirit and scope of the invention. Therefore, above description and illustration should not be construed as limiting the scope of the invention, which is defined by the appended claims.

What is claimed is:

1. An optical pick-up comprising:
   a light source for emitting at least two light beams including first and second light beams; and
   an optical system for leading said first light beam from said light source to a recording surface of an optical disc at a first location and then leading said first light beam reflected from said optical disc to a first detection system, said optical system also leading said second light from said light source to said recording surface of said optical disc at a second location, which is separated away from said first location in a predetermined direction but is adjacent thereto, and then leading said second light reflected from said optical disc to a second detection system;
   wherein:
   said second detection system includes a tracking error detecting means for detecting a tracking error of said second light beam and adjusting means for adjusting a light intensity of said second light beam to be emitted from said light source in accordance with a tracking error of said second light beam on said optical disc;
   said tracking error detecting means includes a pair of light receiving elements and a differential amplifier having a pair of input terminals connected to said pair of light receiving elements, respectively, and an output terminal for outputting a tracking error signal of said second light beam on said optical disc; and
   said adjusting means includes a gain controller connected to receive said tracking error signal from said differential amplifier and a laser driver circuit which receives a gain-controlled tracking error signal from said gain controller and supplies a drive signal to said light source in response to said gain-controlled tracking error signal.

2. The pick-up of claim 1, wherein said tracking error detecting means includes: a polarizing beam splitter for deflecting a portion of the second light beam reflected from said optical disc in a predetermined direction; a half wavelength plate and a Wollaston polarizing prism disposed in the order mentioned in said predetermined direction; and wherein said light receiving elements are disposed to receive said deflected portion of said second light beam after passing through said half wavelength plate and said Wollaston polarizing prism.

3. The pick-up of claim 1, wherein said first detection system includes a knife edge for dividing said first light beam reflected from said optical system into two beams one of which is directed to a focusing error detecting light receiving device and the other of which is directed to a tracking error detecting light receiving device.

4. The pick-up of claim 1, wherein said first light beam is used for recording information on a particular recording track of said optical disc and said second light beam is used for reproducing the information recorded on said optical disc by said first light beam immediately thereafter for confirmation.

5. An optical pick-up for use with an optical disc comprising:
   a light source emitting at least a first light beam and a second light beam;
   a first light detection system and a second light detection system;
   an optical system which (i) directs the first light beam from the light source to a first location at a recording surface of an optical disc from where at least a part of the first beam is reflected to form a first reflected light beam and directs the first reflected light beam to the first detection system, and (ii) directs the second light from the light source to a second location at the recording surface of the optical disc, where the first location and the second location are adjacent each other but are spaced from each other along the recording surface in a predetermined direction, and where a least a part of the second light beam is reflected from the second location to form a second reflected light beam, and directs the second reflected light beam from said optical disc to the second detection system;
   wherein the second detection system includes a tracking error detecting circuit which includes a pair of light receiving elements receiving the second reflected beam and in response generating respective detection signals, a differential amplifier having respective input terminals connected to said light receiving elements to receive said detection signals, and an output terminal outputting a tracking error signals as a function of the relative values of the detection signals, and the second detection systems further includes an adjusting circuit comprising a gain controller connected to receive the tracking error signal for the differential amplifier and in response to generate a gain-controlled tracking error signal, and a laser driver circuit which receives the gain-controlled tracking error signal from the gain controller an in response supplies to the light source a drive signal which varies as a function of the gain-controlled tracking error signal.

6. An optical pick-up as in claim 5 in which the drive signal causes the laser source to increase the intensity of the second light beam with an increase of the tracking error of the second light beam and to decrease the intensity of the second light beam with a decrease of the tracking error of the second light beam.

* * * * *